United States Patent
McCabe (10) Patent No.: US 7,386,463 B2
(45) Date of Patent: Jun. 10, 2008

(54) DATA/PRESENCE INSURANCE TOOLS AND TECHNIQUES

(75) Inventor: Ron McCabe, Salt Lake City, UT (US)

(73) Assignee: Miralink Corporation, Salt Lake City, UT (US)

( * ) Notice: Subject to any disclaimer, the term of this patent is extended or adjusted under 35 U.S.C. 154(b) by 1327 days.

(21) Appl. No.: 09/925,938

(22) Filed: Aug. 9, 2001

(65) Prior Publication Data

US 2002/0095317 A1 Jul. 18, 2002

Related U.S. Application Data

(60) Provisional application No. 60/224,399, filed on Aug. 10, 2000.

(51) Int. Cl.
*G06Q 40/00* (2006.01)
(52) U.S. Cl. .......................... 705/4; 705/405
(58) Field of Classification Search .......... 705/4
See application file for complete search history.

(56) References Cited

U.S. PATENT DOCUMENTS

| | | | |
|---|---|---|---|
| 5,202,827 A | 4/1993 | Sober | 364/401 |
| 5,455,932 A | 10/1995 | Major et al. | 395/489 |
| 5,537,533 A | 7/1996 | Staheli et al. | 395/182.03 |
| 5,574,950 A | 11/1996 | Hathorn et al. | 395/861 |
| 5,592,618 A | 1/1997 | Micka et al. | 395/182.07 |
| 5,633,999 A | 5/1997 | Clowes et al. | 395/182.04 |
| 5,734,818 A | 3/1998 | Kern et al. | 395/182.18 |
| 5,748,870 A | 5/1998 | Tims et al. | 395/182.02 |
| 5,771,354 A * | 6/1998 | Crawford | 709/229 |
| 5,812,748 A | 9/1998 | Ohran et al. | 395/182.02 |
| 5,835,953 A | 11/1998 | Ohran | 711/162 |
| 5,855,005 A * | 12/1998 | Schuler et al. | 705/4 |
| 5,870,537 A | 2/1999 | Kern et al. | 395/182.04 |
| 5,970,464 A * | 10/1999 | Apte et al. | 705/4 |

(Continued)

FOREIGN PATENT DOCUMENTS

JP 2004-171556 * 6/2004

OTHER PUBLICATIONS

"British Insurance Company Offers Virus Insurance May 13, 1993;" Newsbytes, May 13, 1993, From Dialog File 16 (Gale Group), Accession No. 02850027.*

(Continued)

*Primary Examiner*—C. Luke Gilligan
*Assistant Examiner*—Vivek Koppikar
(74) *Attorney, Agent, or Firm*—Marger Johnson & McCollom, P.C.

(57) ABSTRACT

Methods for insurance of online presence (202) and/or data (200) are described. An insurer (302) contracts with an insured entity (304) in an agreement (308) under which a premium (310) is paid for insurance coverage. The premium is calculated (306) using a pure premium method (400) or a loss ratio premium method (402), in a manner that depends on factors such as expected virus scan results (404), expected data recovery time (406), expected geographic spread (408), use of multiple recovery methods (410), and other information regarding the insured entity's business and the technical protection services (206) to be used. In some embodiments, the technical protection services are provided under the agreement by a third party technical services provider (300). Systems, signals, and configured media are also described.

9 Claims, 4 Drawing Sheets

U.S. PATENT DOCUMENTS

| | | | | |
|---|---|---|---|---|
| 6,016,536 | A | 1/2000 | Wu et al. | 711/173 |
| 6,052,797 | A | 4/2000 | Ofek et al. | 714/6 |
| 6,065,018 | A | 5/2000 | Beier et al. | 707/202 |
| 6,615,181 | B1* | 9/2003 | Segal | 705/4 |

OTHER PUBLICATIONS

"Viruses And Forged Faxes Now Get Insurance Protection;" Newsbytes, Feb. 25, 1991, From Dialog File 16 (Gale Group_), Accession No. 01545787.*

"Data Security Harmed by Blissful Insurance," Insurance Accountant, published on Apr. 12, 1999, p. 1, vol. 1, No. 11, From Dialog File 625 (American Banker Publications), Dialog ID No. 0235258.*

"Disaster Protection: Insurers Will Rescue Only What You Protect," by Ian Cheeseman, Computerworld, Apr. 23, 1990, vol. 24, No. 17, p. 81-83 and 95-98. Dialog ID No. 00495060.*

"Insure your computer system" by Terry Corbitt; Management Services, Jul. 1997, vol. 4, No. 7; pp. 24-25, ISSN: 0307-6768. Dialog ID No. 01472505. (From the Dialog file ABI/Inform®).*

"Nonstop Networks; Company Profile", no later than Apr. 8, 1999, pp. 1-14.

"Nonstop Networks; SFT III vs Mirroring Utilities", *Nonstop Networks Limited*, 1991-1996, pp. 1-6.

"Nonstop Networks Limited—Press Release", Mar. 4, 1996, pp. 1-2.

"Nonstop Networks Ltd.: No*Stop Network", *PC Magazine*, May 14, 1996, pp. 1-5.

"As Hacking Mounts, More U.S. Insurers Offer Policies That Cover Internet Losses", *The Wall Street Journal*, Mar. 6, 2000, p. A27C.

"Insurance for Internet and E-Commerce Liabilities", *The Computer Law Association Bulletin*, vol. 15, No. 1, pp. 14-19; no later than Apr. 25, 2000.

"IBM & Insurance Firms Creating Data Insurance", pp. 1-3, May 21, 1998.

"E-insurance: Protecting data, networks, and secrets", from www.insure.com, pp. 1-6, no later than Dec. 17, 1999.

"Lloyds to offer firms insurance against hackers", from www.zdnet.com, pp. 1-3, Apr. 23, 1998.

"Tape Storage Solutions for the Insurance Marketplace", pp. 1-3, no later than Dec. 17, 1999.

"PLATINUM Backup and Recovery: Check Your Data Insurance Policy", from www.platinum.com, pp. 1-6, no later than Dec. 17, 1999.

"Online Data Insurance", *PC Computing*, pp. 1-2, Mar. 15, 1999.

"Double-Take; Meeting the New Requirements for Enterprise Data Protection", *NSI Software*, 1997, pp. 1-16.

Definitions of "data", "protection", "protect", "insurance" from *American Heritage Dictionary*, Third Edition; 1992.

"Got CyberInsurance?", *Computerworld*, p. 44, Aug. 21, 2000.

"IBM & Sedgwick Roll Out Data Insurance for Internet", *Newsbytes*, Sep. 28, 1998.

Miscellaneous trademark office action references, from 76/108606 for Data Insurance and 76/108607 for Data Protection Insurance; 20 pages; various dates, no later than Feb. 22, 2001.

Stern, "Protect Your Assets", Home Computing Office, pp. 52-57, Mar. 1994.

* cited by examiner

DATA/PRESENCE INSURANCE TOOLS AND TECHNIQUES

RELATED APPLICATIONS

This application claims priority to, and incorporates by reference, provisional application Ser. No. 60/224,399 filed Aug. 10, 2000. In the event of conflict, the express content of the present application governs over the incorporated material.

FIELD OF THE INVENTION

The present invention relates to risk management and the protection of computer data and services, and relates more particularly to "E-Insurance" or "Data Insurance" processes and systems.

TECHNICAL BACKGROUND OF THE INVENTION

The management of risk is a key element of modern business practices. All businesses, families and individuals experience potential losses from natural disasters (fire, flood, hurricane, typhoon, etc.), man made events (terrorist acts, bomb, criminal disruption), lawsuits, and accidents. Risk management is the art and science of predicting these potential losses and developing an efficient plan to manage them if and when they occur.

Virtual Assets are Important

In the "New Economy" the assets of business entities are transitioning from traditional hard assets such as bricks and mortar to virtual assets such as web presence, transactions per hour, rate of service, and so on, or relying solely on such virtual assets. Now more than ever the electronic presence of the corporation determines immediate market capitalization as well as long term profitability and viability. Interruption of digital services can pose long-term financial repercussions well beyond the initial financial losses due to interruption.

Traditional Insurance Approaches are not Adequate

Traditional methods of insurance are not properly structured to address the volatile risk involved in the transitional business methodologies employed in the emerging financial and business environment. In order to better understand the nature of the current insurance business process problem it is helpful to review historical and current methods in insurance.

Justice Black in the 1943 Southeastern Underwriters Association decision wrote, "Perhaps no modern commercial enterprise directly affects so many persons in all walks of life as does the insurance business. Insurance touches the home, the family, and the occupation or business of almost every person in the United States."

Insurance is a financial arrangement for redistributing the costs of unexpected losses according to a legal contract whereby an insurer agrees to compensate an insured for losses. A loss can be defined as an undesired, unplanned reduction of economic value. A chance of loss represents the probability of a loss. It is a fraction whose numerator represents the number of losses, and whose denominator represents the number of exposures to loss.

A peril is the cause of a loss. In traditional environments this could be a physical event like a flood; in the new economy this could be a computer virus. Hazards are conditions that serve to increase the frequency or severity of perils. Traditionally this might be an unsafe scaffolding; in electronic business this might be a faulty server load balancing device or a database with a bug.

Direct losses refer to the loss of property. Normally this is the loss of a physical tangible asset; in the new economy this could be the loss of data or the loss of users due to system downtime. Traditionally, indirect losses result from the loss of use of property. For instance, ripple effects in a business that has experienced critical down time may be viewed as indirect losses.

Risk can be defined as the variability in the possible outcomes of an event in some general environment based on chance or uncertainty concerning loss. The degree of risk refers to the accuracy with which an event based on chance can be predicted. Pure risk exists when a loss or an unchanged state occurs as only as the result of an event based on chance. If one may gain as a result of chance, the situation is described as a speculative risk.

In the new economy, data itself is normally not insured because it is subject to pure risk. That is, the chance of data damage or data loss is viewed, as a practical matter, as being so unpredictable that the risk to data is a pure risk. Providing insurance for pure risks is not traditionally considered a good business model for an insurance underwriter.

Traditional environments have a series of clearly defined variables that allow an accurate prediction of risk and thus an avoidance of pure risk. In transactions-based environments as well as web-based environments, such variables have been in many ways non-definable. It is ironic that the Internet and the electronic economy, which have in some ways been great equalizers in business and personal achievement, have also introduced such a volatile set of undefined, distributed, and fluctuating variables. In a traditional setting a large organization had a greater opportunity to complete larger transactions with greater risk. This was offset by a greater infrastructure, and related financial reserves. Now a small business often has just as much opportunity to do a large transaction. Competition margins have been compressed, and competitive activities accelerated.

The speed of transactions in this environment and the variable value per transaction have introduced a new set of risks that are somewhat nebulous and hard to define. Traditionally transactions and a business would grow within a limited growth curve. Now a business and its related customer base can grow at an exponential rate with every transaction completely unrelated to the last, in the sense that each and every transaction within a series may or may not increase risk at an exponential rate. In the new economy, hazards are also often localized rather than spread out.

Traditionally the law of large numbers is a basis for averaging risks, which allows insurers to predict losses accurately. This mathematical rule states that the greater the number of observations of an event based on chance, with each given occurrence of the event independent of each other occurrence, the more closely will the actual percentage of a particular result approximate the expected percentage of that result. In the old economy this prediction worked within reasonable parameters, e.g., along a predictable bell curve X number of 40 year olds will die or Y number of businesses will experience catastrophic losses.

However the law of large numbers assumes that a large group of businesses or people will experience a series of unrelated events or risks at different times in different places. For instance, in a model based on the law of large numbers the death of a particular individual in the population does not significantly change the risk with respect to other individuals.

This rule does not account for the concentration of relatively large assets and related interests within relatively small geographic location.

For instance, in a web-based high speed transaction environment a significant portion of a large organization's potential loss or gain may depend on a single network server. Further risk concentration issues are created by the mass deployment of shared data centers and web hosting facilities. For example, if a catastrophic event occurred at just one data center owned by a large data center/web hosting/E-commerce facility, then the valuations of many of the "hot" new economy companies would tumble, their critical transactions would cease, and significant ripples could be felt throughout the economy as a whole. From a business insurance underwriting point of view, the law of large numbers would be defeated as this "isolated" catastrophic disaster would not affect just one business, but literally thousands.

Traditionally, the components of an insurance premium are the cost of losses, the expenses of operating the insurance company, the reserves needed for the unexpected losses, and the investment earnings available when premiums are paid in advance. The undefined risks and concentration issues related to an electronic economy makes the cost of losses and the reserves into something viewed, as a practical matter, as pure risk. Pure risk is the realm of a compulsive gambler, not an insurance underwriter.

Thus, there is a need for different or complementary tools and techniques for risk management of data and of connectivity or online responsiveness as assets of a business. More particularly, there is a need for better tools and techniques for providing appropriate insurance coverage of such assets. The present invention is directed toward this need.

BRIEF SUMMARY OF THE INVENTION

The invention provides tools and techniques for providing technical data protection services pursuant to the issuance or maintenance of data insurance policies by others. A method of the invention comprises the steps of: a technical services provider contracting to provide an insured entity with technical data protection services, the contracting step memorialized in an agreement whose named parties or intended beneficiaries include the technical services provider, an insurer, and the insured entity; and the technical services provider providing the insured entity with technical data protection services pursuant to the agreement. In some embodiments, the providing step provides data mirroring services. In some, it provides virus detection services, at a local server and/or at a secondary server which is either local or remote. In some, a snapshot stored on the secondary server can be used for rollback and data recovery if a virus is detected.

A system according to the invention comprises a storage medium configured with insured data belonging to an insured entity, and a means (e.g., remote mirroring tools and/or anti-virus software) for supporting the provision to the insured entity of technical data protection services pursuant to an agreement. The agreement's named parties or intended beneficiaries include a technical services provider, an insurer, and the insured entity.

A signal according to the invention is embodied in a computer or network. The signal comprises an agreement whose named parties or intended beneficiaries include a technical services provider, an insurer, and an insured entity, and whose terms require the technical services provider to provide the insured entity with technical data protection services.

A configured storage medium according to the invention embodies data and instructions readable by a computer system to perform a method for providing an insured entity with technical data protection services. The services are to be provided pursuant to an agreement whose named parties or intended beneficiaries include a technical services provider, an insurer, and the insured entity, and whose terms require the technical services provider to provide the insured entity with the services. The method comprises the steps of providing the insured entity with the technical data protection services pursuant to the agreement, and providing the insurer electronically with a report on the status of such provision of services.

Another method of the invention is for providing data insurance based on data mirroring services. This method comprises the steps of: an insurer calculating an insurance premium for a data insurance policy; and the insurer contracting to provide data insurance under the policy to an insured entity subject to the use of technical data protection services, the contracting step memorialized in an agreement whose named parties or intended beneficiaries include the insurer, a technical services provider, and the insured entity. Sometimes the calculating step uses a pure premium method of rate calculation, and sometimes it uses a loss ratio method of rate calculation. Depending on the embodiment, the calculating step factors in information such as: an expected result of virus scanning to be performed on the data as a technical data protection service, an expected data recovery period, an expected geographic dispersion of data which is backed up by a technical data protection service, and/or an expected technical data protection service employing multiple methods of data recovery. The contracting step may memorialize in the agreement a right of the insurer to inspect and approve data recovery facilities at a location operated by the insured entity.

Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The meaning of several important terms is clarified in this specification, so the claims must be read with careful attention to these clarifications. For instance, specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here and/or elsewhere in the application file. In particular, an "embodiment" of the invention may be, without limitation, a system, an article of manufacture, a method, and/or a computer memory, CD, disk, or other digital or analog medium that is configured according to the invention.

Formulating Criteria for a Solution

To some extent, this section discusses the technical background of the present invention. However, criteria for solving the general problem of risk management identified above can be formulated in various ways, so the formulations presented here would not necessarily be obvious.

Ideally Insurable Loss Exposures

What kinds of loss exposures are ideal for insurance coverage? The selected criteria are as follows:
1. A large group of similar items exposed to the same peril of accidental loss spread over a geographic distance.
2. Definite (defined, known) losses capable of causing economic hardship.
3. Extremely low probability of a catastrophic loss to the insurance pool.

Although these criteria represent the ideal in practice, insurance is written under less than ideal conditions. However, insurance ventures that depart too far from the ideal are likely to fail. Now we consider each criterion in turn.

A Large Group of Similar Units Exposed to the Same Peril(s) of Accidental Loss

An insurance pool needs a substantial number of individual units to obtain predictive accuracy, which is the statistical benefit of the law of large numbers. To be successful, an insurance system must reduce risk by predicting within an acceptable range both the mean frequency and the mean severity of losses.

Predictive accuracy can be attained only when an insurance pool has a large number of insured exposures. Although the definition of a large number of exposures depends on several factors, a workable definition is a number of exposures large enough to allow for predictive accuracy. Traditionally, increasing the number of exposures also increased the geographic area over which the exposures were distributed. A critical test is whether or not the size of the insurance pool is large enough to foretell future results with sufficient accuracy to calculate a sound insurance premium.

The items in an insurance pool, or the exposure units, need to be similar (but not the same) so that a fair premium can be calculated. The fire damage done to brick homes will ordinarily be less than that suffered by wooden homes. It would be unfair to combine them in the same insurance pool and charge each insured the same premium rate based on the combined losses of the pool. If such an attempt were made, the rate developed would cause the owners of brick homes (less susceptible to loss) to pay too high a premium and the owners of wooden structures (more susceptible to loss) to pay too low a premium. When significant unfairness, or subsidization, occurs, the insurance pool does not fairly transfer the costs of the losses. This situation cannot continue in a competitive insurance market.

The perils faced by the exposures in the insurance pool should be the identical perils (but not physically the same) for the same reasons requiring the exposures to be similar to one another. That is, assume some buildings in an insurance pool were especially susceptible to fire damage because they were located near a gas station. Assume the other exposures in this pool were not faced with this additional peril. Charging all insured in the pool the same rate would be unfair. The non-explosion-prone exposures would be paying too high a premium and would soon drop out of this insurance pool.

But this reasoning does not apply as well in a digital environment. In a physical environment two buildings may be on either side of the same gas station. If the gas station were to blow up it is unlikely that both buildings would be damaged equally. In a larger pool of one thousand buildings by one thousand gas stations it is unlikely that all one thousand gas stations would blow up at once. Furthermore it is even more unlikely that all of these buildings would be equally damaged as they could be at different angles to the blast and at different relative differences.

By contrast, consider one thousand Internet shoe stores. They may all advertise on the Yahoo site or auction goods on the Ebay site. In the event of downtime on either of those two "concentrator" sites, all one thousand of the Internet shoe stores would experience a loss event. Unlike a group of one thousand off-line stores, these same one thousand online shoe stores may all be in one large Internet hosting site that may experience the same physical or technical disaster. Or these same one thousand Internet shoe stores may be trading shoes through one supply chain distributor that experiences difficulty, transitioning the lost transaction to all one thousand Internet shoe stores. The "E-Economy" can and will inadvertently defeat the law of large numbers as traditionally understood.

Losses Must Be Definite, Measurable, and of Sufficient Severity to Cause Economic Hardship For an insurance system to pay for a member's loss, the loss must be a verifiable, definite loss. Otherwise, much undesirable courtroom litigation to determine whether or not a loss has, in fact, happened would result. Thus, an individual can be insured against the loss of a house as the result of a fire, but cannot be insured against its loss as the result of its being haunted. More realistically, health insurers often limit payments for mental illness because of the difficulty of determining the onset, presence, or absence of the covered condition in many cases.

Termite damage is usually not insured by property insurance contracts because it is often too difficult to determine the time when the loss occurred and the extent of damage. Termite exterminators often guarantee their work and agree to pay for subsequent damage if the treatment fails. However, they usually do so only after a thorough inspection and chemical treatment. Moreover, their guarantee is usually contingent on follow-up inspections. The whole transaction is more in the nature of a service contract or a warranty, neither of which is insurance in the strict sense, although some similarities exist.

It is also important that the losses insured against be measurable. The loss of a loved pet can cause a family much grief, but such discomfort is not easily measured. Also, a morale hazard may be created when pets are insured for substantial sums. Thus, losses of pets are excluded from standard homeowner insurance contracts. The loss of racehorses or valuable livestock does represent an insurable exposure, however, because the damage sustained can be measured in economic terms.

Insurance operates most successfully when the potential damage caused by a peril is severe enough to cause economic hardship. Insuring inexpensive items, especially if losses are frequent, would result in premium charges equal to or greater than the potential damage, which of course makes such insurance unattractive. As a rule, insurance should be purchased only when losses are large and uncertain. This is known as the large loss principle.

The large loss principal may be reversed in an electronic transaction environment. The number of predicted transactions is not definable or constant. The value of these losses can be completely variable. In a web-based environment the down time of a Web site can be a non-event, a catastrophic loss, or have impact somewhere in between, depending on when it occurs and other factors. A gas station that has its pumps break may lose one day's business, but a web site with a downed server for one day may lose its users for good. The large loss principle also assumes that the risk of loss remains essentially constant. In the new economy this apparently may not be the case.

Catastrophic Losses

As used here, a catastrophic loss exposure is "a potential loss that is unpredictable and capable of producing an extraordinarily large amount of damage relative to the assets held in the insurance pool." Despite the common convention of identifying any extraordinarily large loss as catastrophic, defining catastrophic loss from an insurance standpoint may be difficult because the definition is relative. A catastrophic loss is one that is extraordinarily large relative to the amount of property or number of exposure units in an insurance pool. Insured catastrophes occur when a single event (peril) can affect a large percentage of the loss exposure units in the insurance pool. Another way of stating this definition is that catastrophic loss potential exists when insured losses are not independent. That is, catastrophic loss potential exists when a loss to one exposure unit implies a likely loss to the other exposure units.

Catastrophic losses from natural disasters normally have two general characteristics: (1) They are limited in geographic impact, and (2) they are not accurately predictable. Thus, earthquakes, volcanoes, and floods have catastrophic loss potential. In the E-economy a normally geographically limited catastrophic loss may affect businesses across the world. As business and individuals are rapidly changing their deployment and uses of electronic tools, the types and limits of losses are not conventionally predictable across a large group.

Traditional Risk Classification

Traditionally, applicants for insurance have been put in classes according to their probability of loss. For instance, a representative member of a risk class for automobile insurance might be urban, male, under the age of 24, with no accidents on his driving record. In life insurance, a representative member of a risk class might be female, 45 years old, of average height and weight. A generally accepted principle of insurance is that each insured, and each class of insureds, should bear a mathematically fair share of the insurance pool's losses and expenses. Simply put, the mathematically fair price for insurance is found by multiplying the probability of loss for the class times the dollar value exposed to loss, then adding a fair share of the insurer's expenses.

The above risk classification techniques are developed by observing defined events across large groups of people or entities. As previously discussed, this does not necessarily work effectively with data and online presence. In the traditional business world, a business is expected to do business at a somewhat predictable rate, with predictable markets and relatively easily determined expenses; in the e-commerce economy this is often not the case.

Risk Classification/Rate Making as Defined by Actuarial Science

The basis of Insurance as a profitable activity is founded on actuarial science. The basic assumptions and methodologies employed by practitioners are flawed when applied to the digital world.

The basic unit calculated when developing an insurance premium is called an exposure. The unit of exposure will vary based on the defined risk characteristics of the insurance coverage. Exposure statistics are commonly called written exposures; these are the units of exposure during a given period. Earned exposures are the units of exposure that have experienced a loss. In-force exposures are the units of exposure "in force" or valid during a given period of time.

An exposure unit may be calculated based on several factors. Suitable basic factors include reasonableness, ease of determination responsiveness to change, and historical practice.

Reasonableness. Each exposure unit should be a reasonable measure of an exposure to a unit of loss. For example an underlying exposure unit on a $25,000 house would be smaller than an exposure unit for a $1,000,000 house. Reasonableness must be defined by a set of characteristics that can be expressed in economic terms.

Ease of Determination. The most reasonable exposure definition is of no use if it cannot be accurately be determined. In the area of computer Data and E-commerce this is one of the areas of greatest exposure and variance.

Responsiveness to Change. An exposure unit which reflects changes in the exposure to loss is preferable to one that does not. This allows prediction of positive or negative change based on defined predictive factors.

Historical Practice. Prior history is the basis of standard rate making, which uses a "Loss Ratio Method" to calculate insurance rates. Loss ratio methods may also be used 402 in calculating premiums 306 according to the present invention; see, e.g., FIG. 4. The larger the base of historical data the more accurate the prediction of exposure units. As the nature, use, and value of data is changing outside historical bounds and parameters, historical practice is conventionally another area of weakness in calculating units of exposure related to data loss.

Related to the above factors is the claim. A "claim" or "insurance claim" is a demand for payment by the insured under the terms and conditions of the insurance contract. The word "claim" may also be used, of course, in reference to a patent claim; the context will make it clear which meaning is intended herein. The date and time of each insurance claim is recorded. Insurance claim statistics are key in the rate making process. As related to data and electronic presence, this approach is somewhat valid in that increased insurance claims may occur within a rate base because of external factors such as inability to get competent personnel within a given region. However, electronic transactions may be able to be rerouted, thus negating the impact of a local cost. But traditional approaches do not have the same statistical value as in traditionally insured assets, due to the conventionally undefined factors outlined above.

Frequency is another factor evaluated when assessing the risk related to a unit of exposure. This might be expressed as the claim frequency per thousand for a given year of exposure.

In an alternative to the Loss Ratio Method, known as the "Pure Premium Method", insurance rates are calculated to provide for the expected losses, expenses, and of course the expected profit, using a formula such as the following:

$$R = \frac{P+F}{1-V-Q}$$

where:
R=Indicated rate per unit of exposure
P=Pure Premium
F=Fixed Expense per exposure
V=Variable Expense Factor
Q=Profit and contingencies factor (this is also where reserves lie in calculation)

Figure 3:
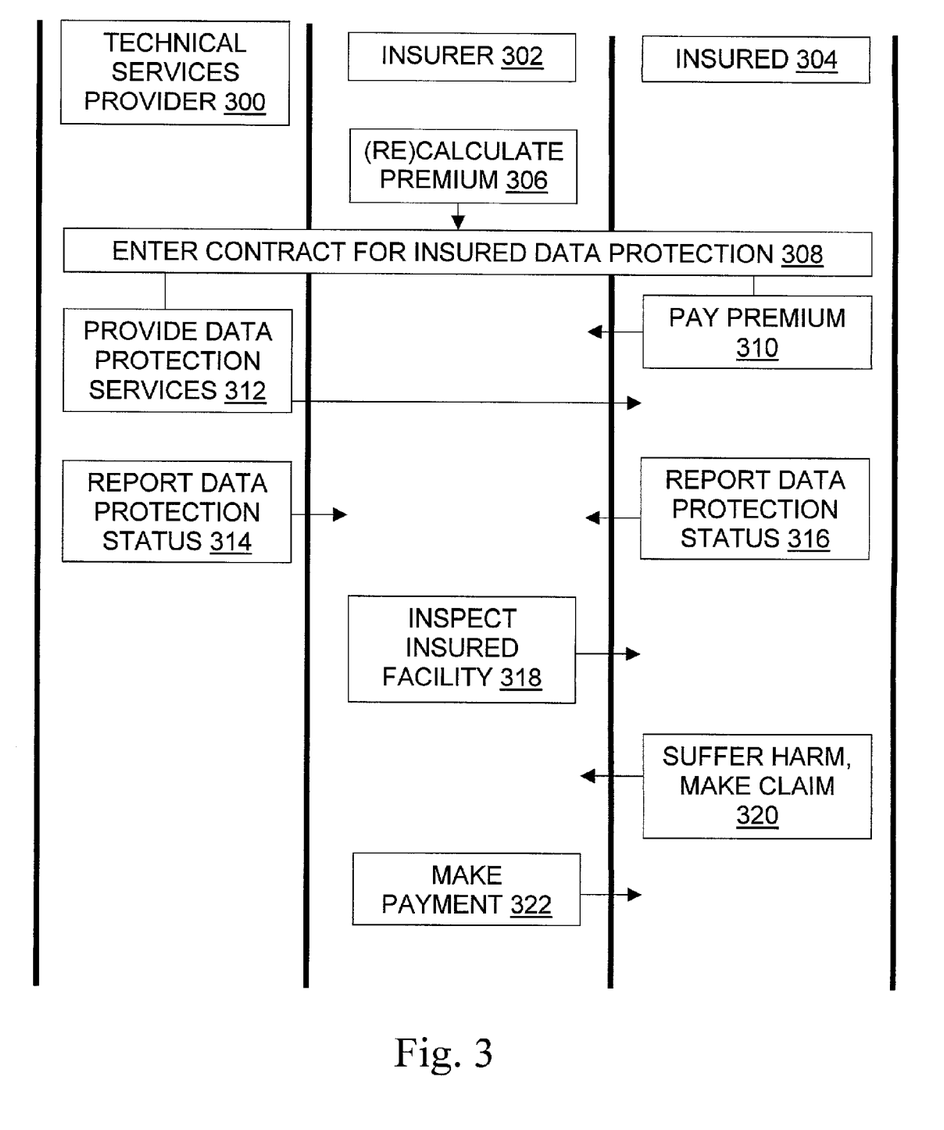
FIG. 3 is a data flow diagram illustrating method steps and other components in operations according to the present invention.

In some embodiments, as indicated for instance in FIG. 3, the present invention helps an insurer 302 calculate 306 insurance premiums by helping define the indicated rate R and the reserves component of Q, by providing tools and techniques for defining risks, coverage requirements, and the like. In particular and without limitation, the invention helps insurers 302 avoid small pools and/or localized pools. Although the discussion herein refers for convenience to "insurers" it will be understood that aspects of the invention may also be used by re-insurers 302, that is, by insurance underwriters who specialize in providing reinsurance to increase the pool of insureds 304.

In a conventional environment data insurance can only be reasonably be calculated (if at all) based on a Pure Premium Method or variant thereof, because the Loss Ratio Method requires historical data to be calculated. Methodologies that are offshoots of these two basic techniques will only be used in the new economy once they are appropriately tailored to the particular challenges posed by that economy. In particular, in the above formula the calculation of pure premium, fixed expense, and variable expense factor are flawed because of a fundamental lack of definition of the rate of change, variance of change value of change, concentration, and extraneous local environmental factors.

Describing the Invention in More Detail

Figure 1:
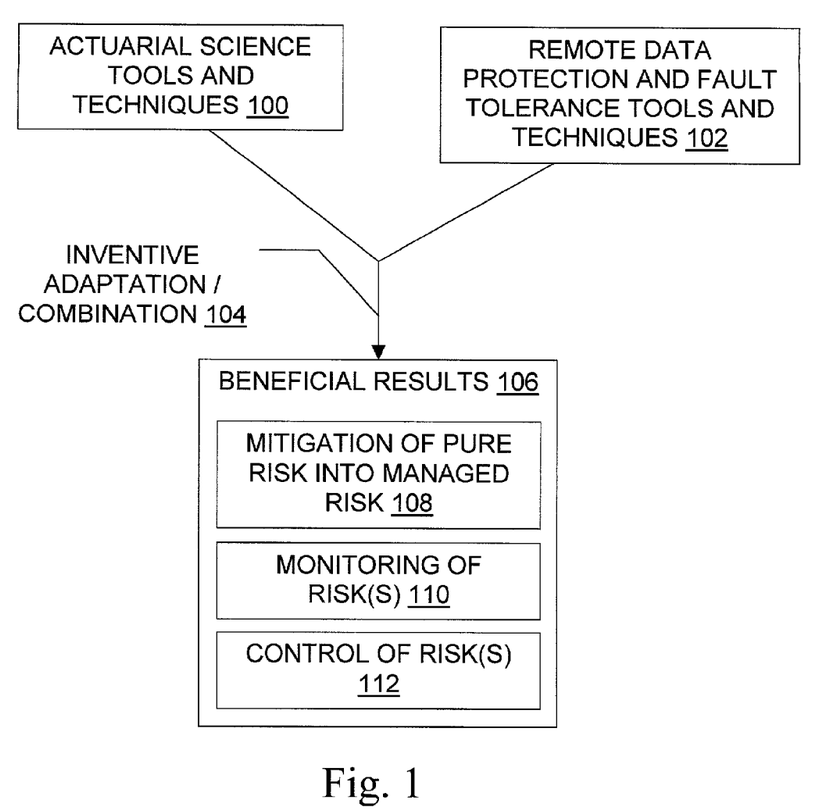
FIG. 1 is a schematic diagram illustrating generally components of the present invention.
Figure 2:
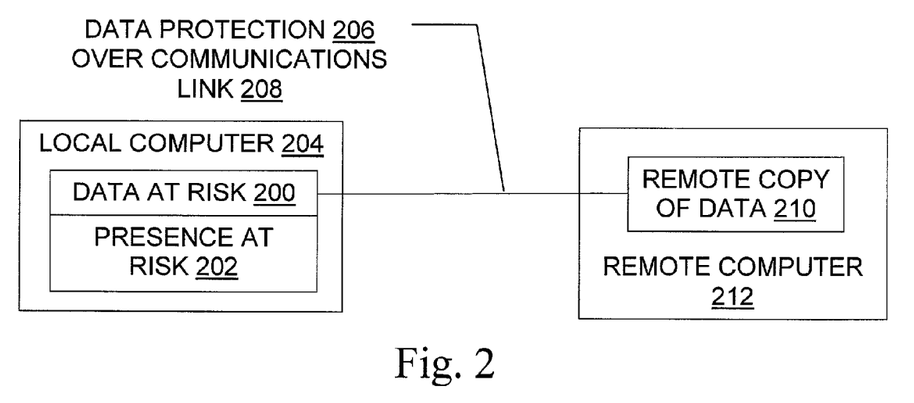
FIG. 2 is a schematic diagram illustrating generally a system which may be configured according to the invention.

As indicated in FIG. 1, if standard methodologies of actuarial science 100 are combined 104 with a series of remote data protection and remote fault tolerance services and/or techniques 102, then benefits 106 result. For instance, previously undefined pure risk factors can be mitigated 108 into acceptable managed risk. Furthermore, concentration issues can be controlled 112 and mitigated. As indicated in FIG. 2, suitable data protection tools and techniques 102 include those such as a file 200 copy (backup 206), replication 206 of data objects 200, and/or data 200 mirroring 206 over at least one communications link 208 to at least one remote location 212, whereby risks to data assets 200 and online presence 202 can be monitored 110 and contained.

A basis of risk or exposure can be calculated during step 306 by monitoring the insured data 200 change activity within a given time period in order to develop an average rate of change. Based on the technique to move 206 the insured data 200 to the remote environment 212, the appropriate amount of bandwidth can be calculated to transfer this data within a reasonable exposure period. If the data change rate or another variable in the premium calculation exceeds the rate permitted by the policy, then the premium may be increased, or coverage may be denied.

The latency or delay of this transfer 206 of insured data 200 is one of the first defined risks. Based on the proposed unit of exposure and acceptable rate, the appropriate average delay can be calculated during step 306 (FIG. 3) in order to underwrite the pure premium of a data/presence insurance contract 308.

Figure 5:
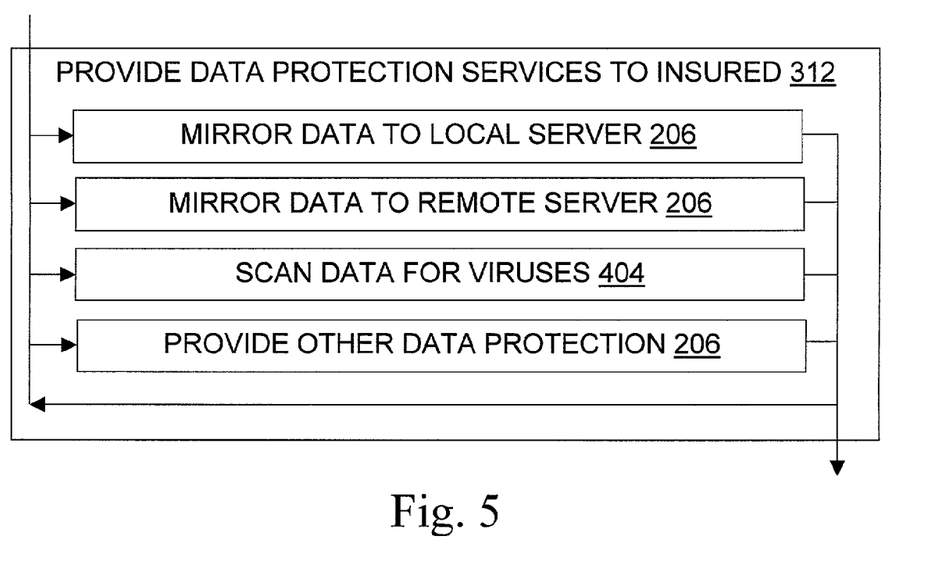
FIG. 5 is a diagram further illustrating a data protection providing step shown in FIG. 3.

Because this data change will be copied to a controlled environment 212, changes in the rate of data or information change (and therefore cost per unit of exposure) can be dynamically calculated. Based on this varying unit of exposure, the pure rate can be changed 306 in order to cover the pure unit of exposure. An individual or organization 304 increasing their controlled risk through greater rates of information or data change will need to pay 310 a higher premium. Based on the value of the unit of exposure, it may be required that alternative transition methods be available 506 (FIG. 5) in the event of the primary method of transmission failing.

Alternatively or in addition, virus scanning 504 of the remote volume 210 and incoming data may be required to further reduce risks due to local environmental protection failures. Snapshots of data images 210 as they previously existed (taken by maintaining physical tape backups of previous time and dates, volume copies, or previous replication files) may be required in order to limit exposure to accidental deletion of critical files. The requirement for these features would be evaluated 306 against the underwritten value of the unit of exposure.

Another risk to be contained is not the risk of data loss, but of downtime. Accordingly, a recovery service may be combined 104 with data insurance. Speed of recovery would only be required in environments where this is insured 308 as a possible unit of exposure. The managed risk would be the relative period of recovery 406 from a related Network Server/Storage Area Network (SAN)/Network Attached Storage (NAS) device 212 failure versus the estimated cost of downtime.

Both of the above risks would be calculated during step 306 by estimating the unit of exposure related to the amount and speed of data change, in view of bandwidth requirements and availability. By tying 104 such variables together the costs of data change and related downtime become manageable risks 108.

However, within this model the law of large numbers should be taken into account. As previously discussed concentration issues may invalidate this basic principal of insurance. Ironically, by providing the combination 104 of an insurance vehicle with a remote data protection technology, a concentration issue can be created through negligence and therefore invalidate or jeopardize applicability of the law of large numbers.

Conversely, if properly managed, the insured location and/or a series of remote data protection facilities 212 can make the law of large numbers applicable. This can be done by employing the related data change and recovery technologies to send 206 protected data from a given geographical region to a series of different facilities 212. By employing this technique the law of large numbers remains intact in that no single contiguous group of insured individuals and/or business entities 304 is exposed to the same environmental risks at the same time. Risk can be further managed 108 by changing the number and/or location of backup centers 212. Furthermore, once historical data and/or statistics are gathered intelligent management of the targeted data depots or remote locations may further reduce risk and related loss exposure.

By employing a high-speed high-bandwidth backbone 208 between data protection locations, local environmental impacts to the data protection or off-site protection facility may be further mitigated 112. For example, if a data protection facility 212 was located in Florida and a hurricane was predicted within 24 hours, then the insured data 200 could be rerouted and transferred to safer facilities in other regions that are not experiencing such risk. Again, this data transfer and rerouting 206 would have to occur intelligently, so that risk concentration issues are not introduced.

Alternatively, based on the insured rate of exposure a data protection fabric may be employed. There is no perfect way 102 to protect data and related change. Each protection method 102 has an environment or series of circumstances that will create a failure or a hole in the desired protection. If the unit of exposure is high enough it may be desirable to employ multiple methods of protection in order to further mitigate this risk. In the event that system 204 recovery is required multiple methods of recovery may be employed 410 in order to decrease the risk of a bad recovery or long recovery window. The possibility of a bad recovery may lead to a requirement for external verification of received insured data 200.

As discussed above, there is always a local environmental risk related to any facility to which the protected data is exposed. In the event that the unit of exposure is too high to justify protection at just one location, multiple locations for both backup and recovery services may be used 412.

The discussion above focused on environments in which insured organizations or individuals 304 do not have the internal infrastructure to provide their own remote protection or backup facilities. But if an organization or individual is large enough to provide their own facilities then data/presence insurance 308 may be tied to an inspection 318 and approval of the facilities, and to the methodologies used to protect the given data and related changes. Different rates 310 may apply as the control variable in the exposure unit is changed.

Once the above methodologies are applied, historical data can be gathered to more accurately predict the relative risk of loss and/or of insurance claims. Once they become applicable, other actuarial practices 100 such as those for rating and adjustment may be applied 104 to data/presence insurance plans 308 that rely on data backup and/or data recovery. As technology and the relative value of data changes, along with the relevant protection points, new techniques and methodologies are needed to provide better data loss insurance. The present invention is directed toward such tools and techniques.

The following examples are provided to help illustrate the invention. They are not meant to be comprehensive, since other embodiments of the invention are also discussed herein. Nor are the examples below meant to be entirely consistent with one another, since they illustrate alternative embodiments of the invention.

EXAMPLE 1

A business 304 conducting electronic commerce receives an average of one order per minute, with ninety percent of orders in the range from $10 to $100 and orders over $200 extremely rare. Orders are mirrored 206 to a local backup server within at most a few seconds of being received. An incremental tape 210 of the local backup server's new content is created 206 each night and stored 206 at a location 212 twenty miles from the local backup server.

An insurance underwriter 302 calculates 306 the average transaction value 412 as $50, the average transaction rate 412 as one per minute, and the exposure period 406 for data loss at 24 hours; the period between updates to the tape archive is used by this underwriter, rather than the update to the local backup server, because the local backup server and the main server 204 are not far enough apart 412 to provide sufficient independent recovery capabilities. The underwriter 302 also notes 306 that on average only half the period will have passed before a data loss event 320. Thus the exposure amount is quite large, namely $50 per transaction times one transaction per minute times (60×24) minutes in the exposure period times ½, that is, $36,000. The underwriter calculates 306 the risk of a loss occurring in the exposure period as one in a thousand. Factoring that in, the indicated rate R is $36, namely, the risk of a loss times the exposure amount.

The underwriter then calculates 306 a premium using this value for R, with suitable values for the underwriter's expenses, contingencies, and profit. As with conventional approaches to insurance, the premium rates set according to the present invention should be high enough to discourage insureds 304 from negligent or other activities that increase the chance of a covered loss. Any claim amounts paid 322 to an insured 304 should be less than the actual economic damage to the insured 304.

EXAMPLE 2

The business conducts electronic commerce as in Example 1, but instead of using a daily tape backup the business uses remote data mirroring technology (see, e.g., U.S. patent application Ser. No. 09/438,184 filed Nov. 11, 1999 and/or U.S. Pat. No. 5,537,533) to backup the data within five minutes at a remote data 210 storage facility 212 located two hundred miles from the main server.

The insurance underwriter calculates 306 the average transaction value as $50, the average transaction rate as one per minute, and the exposure period for data loss at five minutes. The underwriter also notes that on average only half the period will have passed before a data loss event 320. Thus the exposure amount is $50 per transaction times one transaction per minute times 5 minutes in the exposure period times ½, that is, $125. The underwriter calculates the risk of a loss occurring in the exposure period as one in a thousand. Factoring that in, the indicated rate R is $0.125, namely, the risk of a loss times the exposure amount. The underwriter then calculates 306 a premium using this value for R, with suitable values for the underwriter's expenses, contingencies, and profit. Since the indicated rate is substantially less than in Example 1, by virtue of the substantial decrease in exposure period duration from 24 hours to five minutes, the premium in this situation is likewise substantially less than in Example 1.

EXAMPLE 3

Variations on the definition of "data loss" 320 are possible. For instance, one insurance policy 308 may cover only events in which no current copy of the data exists, while another policy 308 may cover events in which a partial but possibly or certainly corrupted copy of the data is available 412. Depending on the business 304, the nature of the data 200, and other factors, a partial copy may or may not be better than no copy. For instance, a partial copy of a graphical image or an audio file may be useful, while a reliable copy of yesterday's transactional records may be preferable to a more recent but possibly corrupted copy of that data.

EXAMPLE 4

The business 304 conducts electronic commerce and backs up its data as in Example 2. In this example, the insurance underwriter 302 provides online presence 202 insurance; a given business may have data insurance 308, presence insurance 308, or both. Data insurance and presence insurance are each examples of "data/presence insurance." Whereas data insurance provides 322 the insured 304 with compensation in response to an insured data 200 loss event online presence insurance provides 322 compensation in response to insured interruptions 320 in the availability of the business's web site or other electronic presence 202. Although the Internet is a prominent example of online businesses, presence 202 in other networks may also be insured according to the present invention. Loss of presence 202 may be caused by factors such as intentional denial-of-service attacks, unexpectedly heavy consumer response to a promotional offer, failure in the business's own hardware/software infrastructure, or failure in a third party service provider's infrastructure.

To calculate 306 a premium, the underwriter 302 determines that the business 304 receives an average of one hundred hits per minute 412, and that the average value of a hit to the business is $2. The average value of a hit 412 is calculated from the conversion rate of hits to transactions and the average size of a transaction; it may also reflect the advertising value of hits if the site sells advertising to third parties, and/or other factors. The business uses remote data mirroring 206 to keep two separate "hot" servers ready to take over if the main server fails. Each of the three servers (main server 204 and two standby servers 212) uses a different backbone 208 access provider to connect with the Internet. The servers are physically separated from each other 408 by at least five hundred miles (in other embodiments, a different distance can be used, and the distance may be specified by the insurer); the main server and the first standby server are located at opposite ends of the business's country of residence, and the second standby server is on a different continent. It takes an average of thirty minutes to detect the quality-of-service problem, determine that a transition (rollover to standby site) is justified, and fully transition service 406 from the main server to one of the standby servers.

Thus the exposure amount is one hundred hits per minute times thirty minutes times $2 per hit, that is, $6000. The risk of a transition due to any one or more of the causes identified is estimated to be one in one hundred, so the risk of loss R is set at $60. The underwriter 302 then calculates 306 a premium using this value for R, with suitable values for the underwriter's expenses, contingencies, and profit.

EXAMPLE 5

The business 304 conducts electronic commerce and seeks online presence insurance as in Example 4, but instead of using a fixed average transition time (thirty minutes in Example 4), the premium cost and claim coverage are calculated 306 using a fixed functional relationship 412 between elapsed downtime and the number of hits or customers lost. This is particularly useful for online businesses whose commercial reputation and position depend heavily on being the best known and most easily located vendor among a group of competing vendors. Customers who cannot access the business 304 may visit a competitor's site for the first time, and decide not to return to the insured business's site even after it becomes available again.

For instance, the economic harm may be defined by an exponential function 412, such as $L(t)=\$Ae^{kt}$, where t is the number of minutes the site has been unavailable, and the constants A and k are determined based on values such as the average number of hits per minute, the average value of a hit, the rate at which customers give up trying to reach the unavailable site, and the percent of customers who do not return after visiting a competing site. The loss function 412 may then be evaluated at specified points, e.g., every ten minutes, to determine the rate of exposure for a corresponding event. Minimum and maximum claim amounts may be specified, so that no additional claim amount is paid 322, for instance, if the site 204 remains down after two hours. The underwriter calculates 306 a set of premiums using the values for R, with suitable values for the underwriter's expenses, contingencies, and profit.

EXAMPLE 6

A business 304 conducts electronic commerce as in Example 1 but uses different data protection technology 102, with corresponding changes 112 to the likelihood of data loss. As a result, the insurance underwriter 302 provides data insurance 308 based on different indicated rates and reserves. For instance, the business may use data mirroring 206 during its normal operation so a copy of each transaction is mirrored within at most one minute to a remote backup server 212 a hundred miles away; or data mirroring to two remote locations, each location being at least five hundred miles 408 from the other backup and from the local server 204; or data mirroring to two remote locations, with a comparison 412 between the two backup images 210 each hour to verify that the backups are good.

EXAMPLE 7

A business 304 conducts electronic commerce as in Example 1 but uses several data protection technologies to create a data protection "fabric" which leads 412 to corresponding changes to the likelihood of data loss. For instance, the business may use a combination of two or more of the following data protection technologies: local data mirroring, remote data mirroring, operating-system-supported data object replication, file-by-file data archiving. This combination may be supplemented by virus scanning 404 at the local and/or remote site(s).

Note that data protection technology 102 combinations may have advantages and vulnerabilities that offset 410 one another. For instance, assume data is backed up by remote mirroring with a one minute latency and also backed up with file-by-file archiving and incremental snapshots having a thirty minute latency, and assume that virus scanning is performed on the remotely mirrored data. Virus scanning 404 helps ensure that the backup reference volume data 210 is good. If an infection is detected, the mirrored data 210 and the original source data 200 may both already be corrupted, but the corrupted data may not yet have been archived, so the archived files 210, an archive journal 210, and/or snapshot 210 can be used 412 to restore the data to a recent and uncorrupted form. Accordingly, the data insurance indicated rate 3 10 will be lower than would otherwise be the case. Overlaying different protection technologies reduces 112 risk of data loss. Likewise, an online presence 202 protection fabric may use different but complementary technologies to reduce 112 the risk associated with interruptions to online presence.

EXAMPLE 8

Same as in one or more of the other examples, but the insured data 200 is not online electronic commerce transactions. Instead, the insured data 200 is generated by other activity. For instance, the insured party 304 may be a trading house or a mortgage broker.

EXAMPLE 9

A business 304 conducting electronic commerce receives transactions at varying rates and for varying amounts. A filter on the business's server 204 extracts information from incoming transactions, and sends 316 the following averages to an insurance under-writer's server each hour: average transaction value, average number of transactions per hour, average time between sending a copy of a given transaction to two remote backup locations and receiving confirmation from each location that the copy has been stored there.

Figure 4:
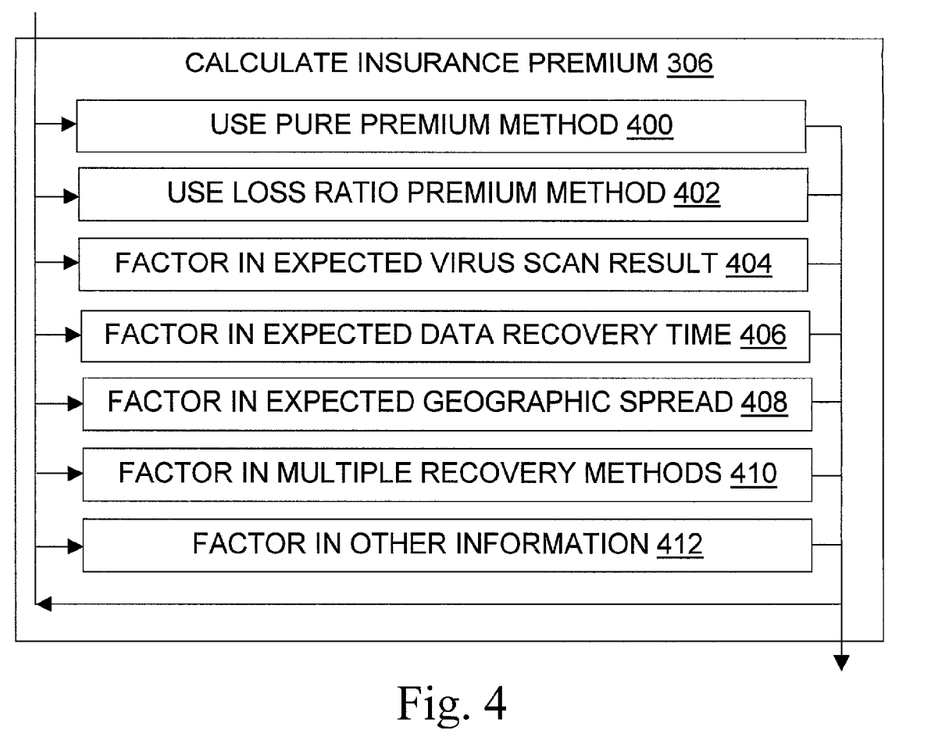
FIG. 4 is a diagram further illustrating a premium calculation step shown in FIG. 3.

The insurance underwriter's server calculates 306 a premium for the next hour based on the averages for the past hour, using a formula such as $R=(T*V)/D$, where R is the rate per unit of exposure in the Pure Premium Method 400 of rate calculation, T is the number of transactions, V is the average transaction value, D is the delay caused by the insured-against event, and the asterisk denotes multiplication. The insurance underwriter server sends an electronic invoice to the business, which automatically pays 310 the premium unless it exceeds a maximum specified by the business, in which case a human manager at the business is notified by email, pager, etc.

EXAMPLE 10

Same as in one or more of the other examples, but the insurance is conditional on certification of the insured's data mirroring facilities by the insurer 302 or by some third party hired by the insurer 302. That is, in some cases a data insurance policy 308 or an online presence policy 308 may require that the technology and/or equipment used to control 112 risk meet certain specified standards, or that it be chosen from a list of approved equipment or be provided/serviced 312 by a vendor 300 from a list of specified vendors.

One embodiment performs a method for providing 312 the insured entity 304 with technical data protection services. The services are to be provided 312 pursuant to an agreement 308 whose named parties or intended beneficiaries include the technical services provider 300, the insurer 302, and the insured entity 304, and whose terms require the technical services provider 300 to provide 312 the insured entity 304 with the services. The method comprises the steps of providing 312 the insured entity 304 with the technical data protection services pursuant to the agreement 308, and providing 314 the insurer 302 electronically with a report on the status of such provision of services.

EXAMPLE 11

Same as in one or more of the other examples, but the data 200 being insured is on a salesperson's laptop 204 (which might also be insured against loss or theft). The data insurance premium 310 and/or coverage 308 is conditioned on how often the salesperson connects to a network 412 to allow the data to be backed up, on the rate of change 412 of the data 200 on the laptop 204 (e.g., five sales and ten new contacts per week), and on the economic value 412 of the data 200 (e.g., the cost of reproducing it from faxed contract copies and the salesman's paper log book, plus the embarrassment and loss of good will with clients). In some embodiments, the premium 310 reflects the existence (and possibly the quality) of a wireless connection 208 between the laptop and the network for data backup purposes. The insurer may require safekeeping of several backups, so that if files have been erased on the laptop, previous backups can be used to restore the file contents.

EMBODIMENTS

Embodiments of the invention include methods discussed herein (e.g., in connection with FIGS. 3-5), computer systems configured by software and/or hardware to operate according to such methods (e.g., as discussed in connection with FIG. 2), computer-readable storage media configured by software to operate according to such methods, and other subject matter as permitted by law. In a given embodiment, the method steps may be performed in a different order than that shown, or in an overlapping manner, or omitted, except to the extent that one step requires the result of another step or to the extent an order is dictated by the claims. Steps may also be repeated, named differently, and/or grouped differently in different embodiments. System, signal, or article components may likewise be repeated, omitted, named differently, and/or grouped differently in different embodiments, except as required.

Figure 6:
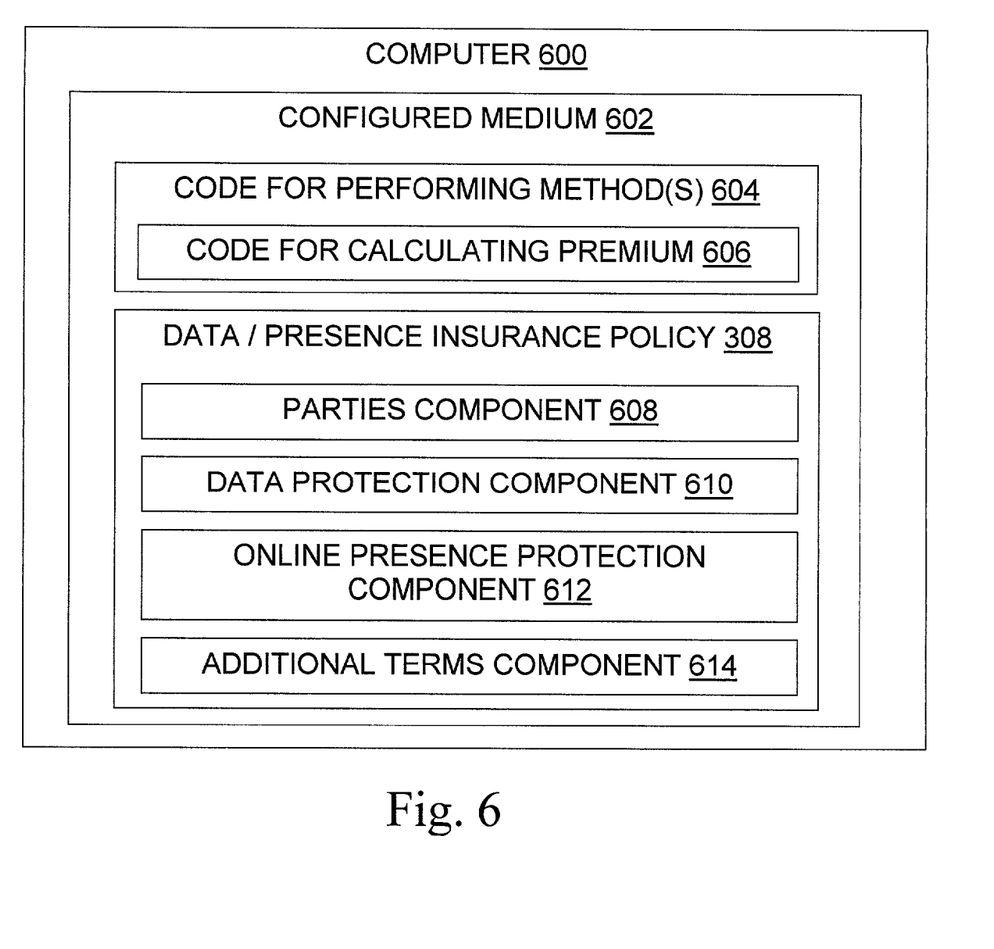
FIG. 6 is a diagram further illustrating systems and configured media according to the present invention.

In particular, as indicated in FIG. 6, methods of the invention may be embodied in configured computer-readable storage media 602. Suitable storage media may include a magnetic, optical, or other computer-readable storage device having a specific physical substrate configuration. Suitable storage devices include floppy disks, hard disks, Iomega ZIP disks, tape, CD-ROMs, PROMs, RAM, and other computer system 600 storage devices. The substrate configuration represents data and instructions 604 which cause the computer system 600 to operate in a specific and predefined manner as described herein. Thus, the configured medium 602 tangibly embodies a program, functions, and/or instructions 604 that are executable by one or more computers 600, 204, and/or 212, or other computing devices to perform insurance rate calculation 606, insurance provision, insured activity monitoring 314 and/or 316, and/or other data insurance or online presence insurance steps of the present invention substantially as described herein.

Particular embodiments of the invention also include insurance policies 308 according to the invention. Such a policy 308 may be embodied in paper, electronic, or other form. In electronic embodiments, the policy may reside in volatile or non-volatile computer memory 602 as illustrated and/or as a signal embodied in a network connection of a distributed computing system 600, as when the underwriter 302 electronically monitors (314 and/or 316) activity at the insured 304. The policy 308 may be characterized as a data structure, and the possible electronic embodiments include general-purpose computer memory configured 602 in a new way by word processor, database, and/or other data structures which provide useful and concrete benefits by promoting data insurance and/or presence insurance as discussed herein. In paper or electronic form, the policy 308 may be characterized as a novel article of manufacture which relies on contract and insurance law and which merits protection under patent law. Other characterizations may also be pertinent.

In the policy 308, a parties component 608 identifies the parties to the policy 308, e.g., the insured 304, the insurer 302, and possibly any data protection or other technology service providers 300. The parties are specified in a legally binding manner, in conformance with generally recognized principles of contract law.

One or more data protection and/or online presence protection term components such as the illustrated components 610, 612 specify the legal terms and conditions for the insurance coverage and premiums, such as transaction rates, transaction values, recovery times, protection and/or recovery technologies to be employed for data and/or online presence risk management, and so on.

Another component 614 includes additional contract terms, which are generally familiar to those of skill. Selection of appropriate terms will often be guided by general principles of contract law, insurance laws and/or regulations, and by particular business circumstances. Suitable examples to consider for inclusion in a specific policy 308 may include, for instance, provisions that state the intended duration of the coverage, address termination of the policy, provide representations and warranties by the parties to the policy, and/or address other issues such as indemnification, remedies, jurisdiction, venue, governing law, dispute resolution, arbitration, notice to the other parties, confidentiality, assignment of the policy, non-waiver, integration, modification of the policy, force majeure, and severability.

Summary

The invention provides tools and techniques for data insurance, online presence insurance, and other forms of insurance suitable for protecting data and electronic presence as business assets. The invention applies general principles of insurance, mathematics, data transmission, and data mirroring to specific contexts, to provide insurance coverage that scales the premiums, coverage amounts, coverage type, and/or other obligations of the insurance underwriter based on factors such as the amount of data generated or used in the normal course of business by the insured entity, protection against viruses, protection against hackers, changes in the rate at which insured data is received at a local and/or remote site, verification of data backups for accuracy, data recoverability, changes in data mirroring bandwidth or latency which fall outside specified parameters, the amount of data at risk, the value of the data at risk, the use of multiple remote data backup locations, the use of data snapshots to permit rollbacks, the storage capacity of remote data storage equipment, storage requirements (e.g., more storage used means a greater risk of some data corruption), certification of the procedures and/or equipment used to mirror insured data, data transaction counts, and/or other factors.

In some embodiments, the underwriter monitors data activity at the insured site, in real-time or near-real-time, and dynamically adjusts the insurance coverage costs and/or coverage in direct response to changes in the monitored activity. Such a feedback loop, like use of the other defining factors, helps change pure risk of data loss or inaccessibility into a defined risk which can then be insured in a commercially reasonable manner.

Although particular systems and methods embodying the present invention are expressly illustrated and described herein, it will be appreciated that apparatus, signal, and article embodiments may also be formed according the present invention. Unless otherwise expressly indicated, the description herein of any type of embodiment of the present invention therefore extends to other types of embodiments in a manner understood by those of skill in the art.

As used herein, terms such as "a" and "the" and designations such as "entity", "technical protection service", and "expected result" are inclusive of one or more of the indicated element. In particular, in the claims a reference to an element generally means at least one such element is required, and "include" means "includes at least".

The invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for providing insurance against data loss, comprising:
    establishing a remote data volume including all data of a local data volume at a point in time;
    updating the remote data volume over a communications link with data changes to the local data volume;
    determining an exposure period, the exposure period based on a time period between a time a data change occurs on the local data volume and a time the data change occurs on the remote data volume, and the exposure period indicating a time over which the data change is at risk;
    calculating an insurance premium using the exposure period; and
    issuing an insurance policy using the insurance premium, the insurance policy covering claims for loss of data from the local data volume.

2. The method of claim 1, further comprising:
    monitoring a data change rate between the local data volume and the remote data volume, the data change rate indicating a rate at which data changes are transmitted to the remote data volume; and
    adjusting the insurance premium in response to the data change rate as the data change rate changes during a coverage period of the insurance.

3. The method of claim 2, wherein adjusting the insurance premium further comprises limiting coverage for loss of data changes from the local data volume if the data change rate increases above a predefined threshold.

4. The method of claim 1, further comprising:
    establishing at least one additional remote data volume, each additional remote data volume including all data of the local data volume at an associated point in time; and
    adjusting the insurance premium in response to a number of the additional remote data volumes as the number of additional remote data volumes changes.

5. The method of claim 1, further comprising:
    inspecting at least one of the local data volume, the remote data volume, and the communications link;
    wherein calculating the insurance premium further comprises calculating the insurance premium in response to the inspection.

6. The method of claim 1, further comprising:
    monitoring an availability of the remote data volume during a coverage period of the insurance; and
    adjusting the insurance premium in response to the availability of the remote data volume as the availability of the remote data volume changes.

7. The method of claim 1, wherein:
    establishing the remote data volume further comprises establishing a plurality of remote data volumes at geographically distinct locations, each of the remote data volumes including all data of the local data volume at an associated point in time; and
    updating the remote data volume further comprises updating each remote data volume over an associated communications link with data changes to the local data volume; and
    further comprising:
        monitoring an availability of each remote data volume during a coverage period of the insurance;
        determining a geographic dispersion of the available remote data volumes; and
        adjusting the insurance premium in response to the geographic dispersion of the available remote data volumes during the coverage period of the insurance as the geographic dispersion of the available remote data volumes changes.

8. The method of claim 1, further comprising:
calculating a loss estimate, the loss estimate indicating a potential loss during the exposure period; and
calculating a probability of loss, the probability of loss indicating the likelihood that data changes occurring during the exposure period may be lost;
wherein calculating the insurance premium further comprises calculating the insurance premium using the exposure period, the loss estimate, and the probability of loss.

9. The method of claim 1, further comprising:
determining an expected data recovery time, the expected data recovery time indicating an expected time between a restoration of data on the local data volume from the remote data volume;
wherein calculating the insurance premium further comprises calculating the insurance premium using the expected data recovery time.

* * * * *